United States Patent
Savage, Jr.

(10) Patent No.: US 6,428,216 B1
(45) Date of Patent: *Aug. 6, 2002

(54) OPTICAL COUPLING OF LIGHT PIPES, WITH LIGHT DIFFUSION

(76) Inventor: John M. Savage, Jr., 538-B Via De La Valle, Solana Beach, CA (US) 92075

( * ) Notice: Subject to any disclaimer, the term of this patent is extended or adjusted under 35 U.S.C. 154(b) by 0 days.

This patent is subject to a terminal disclaimer.

(21) Appl. No.: 09/289,886

(22) Filed: Apr. 12, 1999

Related U.S. Application Data

(63) Continuation-in-part of application No. 09/188,279, filed on Nov. 9, 1998.

(51) Int. Cl.$^7$ .................................................. G02B 6/42
(52) U.S. Cl. ............................. 385/88; 385/33; 385/92; 385/93
(58) Field of Search ............................. 385/88, 92, 93, 385/39, 31, 60–63, 78, 79, 81, 133, 147, 146, 33–35, 36, 37; 296/211; 362/32, 30; 382/141

(56) References Cited

U.S. PATENT DOCUMENTS

| | | | |
|---|---|---|---|
| 4,539,625 A | * | 9/1985 | Bornstein et al. .............. 362/32 |
| 5,202,950 A | * | 4/1993 | Arego et al. ................. 385/146 |
| 5,207,492 A | * | 5/1993 | Roberts ........................ 362/30 |
| 6,039,390 A | * | 3/2000 | Agrawal et al. ............ 296/111 |
| 6,264,376 B1 | * | 7/2001 | Savage, Jr. ................... 385/88 |
| 6,292,580 B1 | * | 9/2001 | Koduri et al. .............. 382/141 |

* cited by examiner

Primary Examiner—Frank G. Font
Assistant Examiner—Michael P. Mooney
(74) Attorney, Agent, or Firm—William W. Haefliger

(57) ABSTRACT

A light transmission device, comprising in combination a longitudinally axially extending light pipe having opposite ends, at least one of said ends having a light diffusing surface.

37 Claims, 6 Drawing Sheets

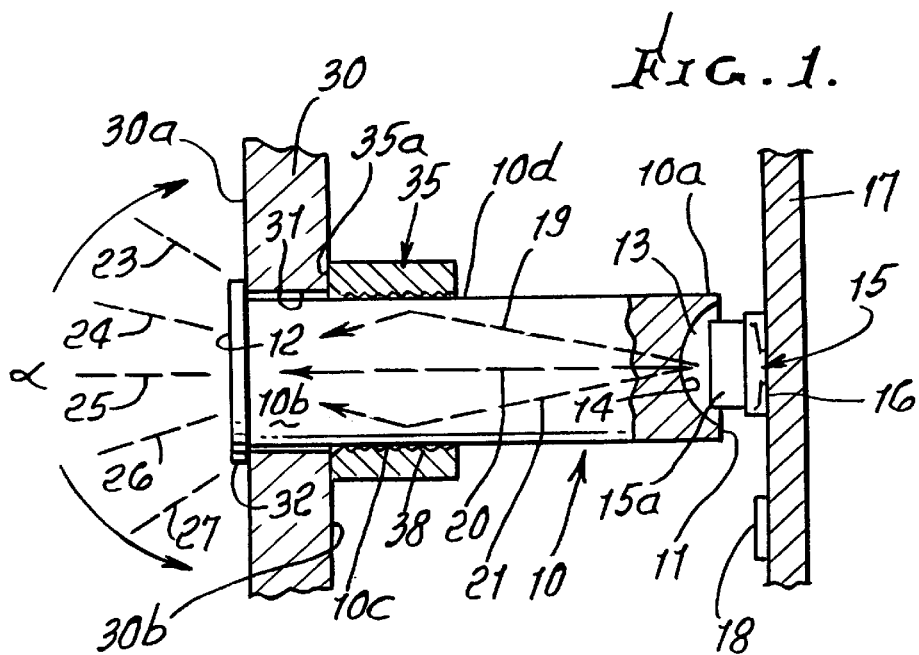
Fig. 1.
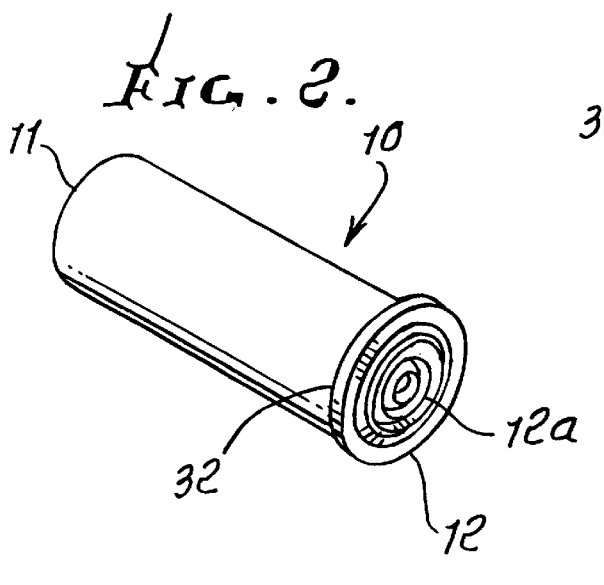
Fig. 2.
Fig. 3.

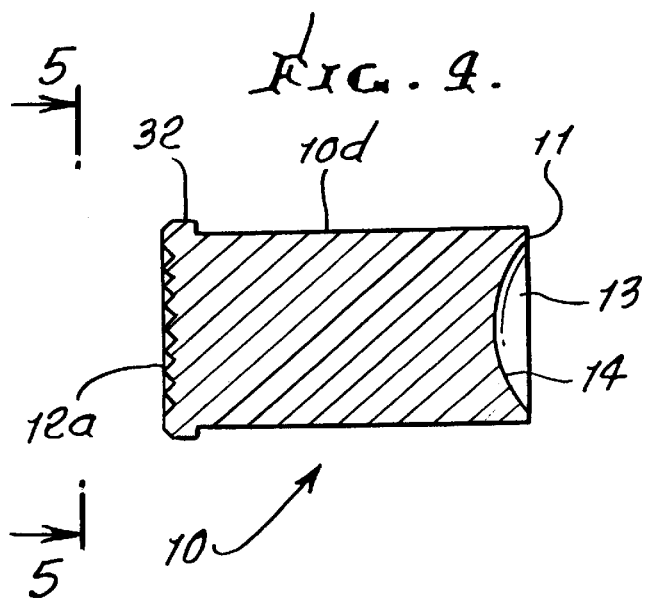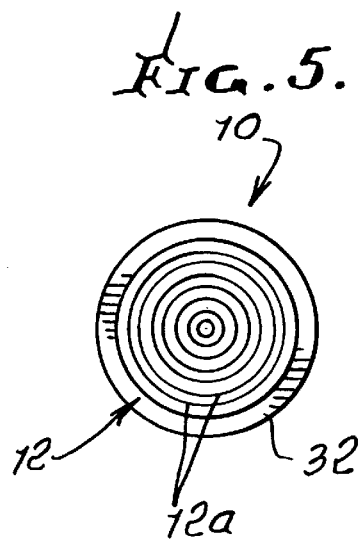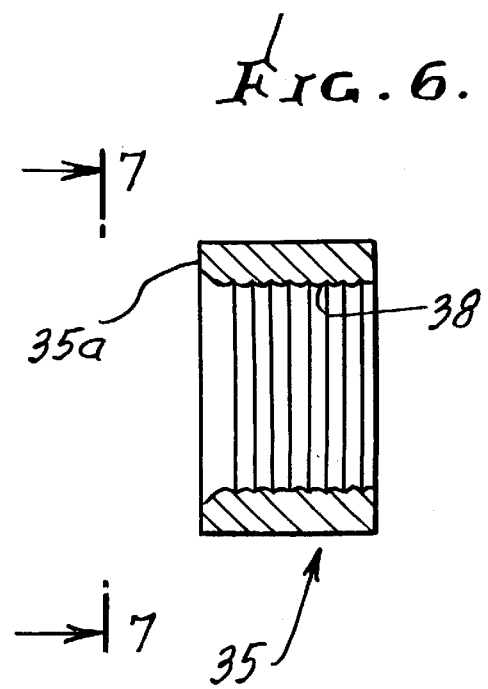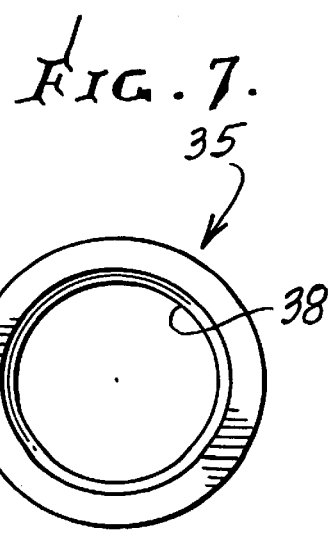

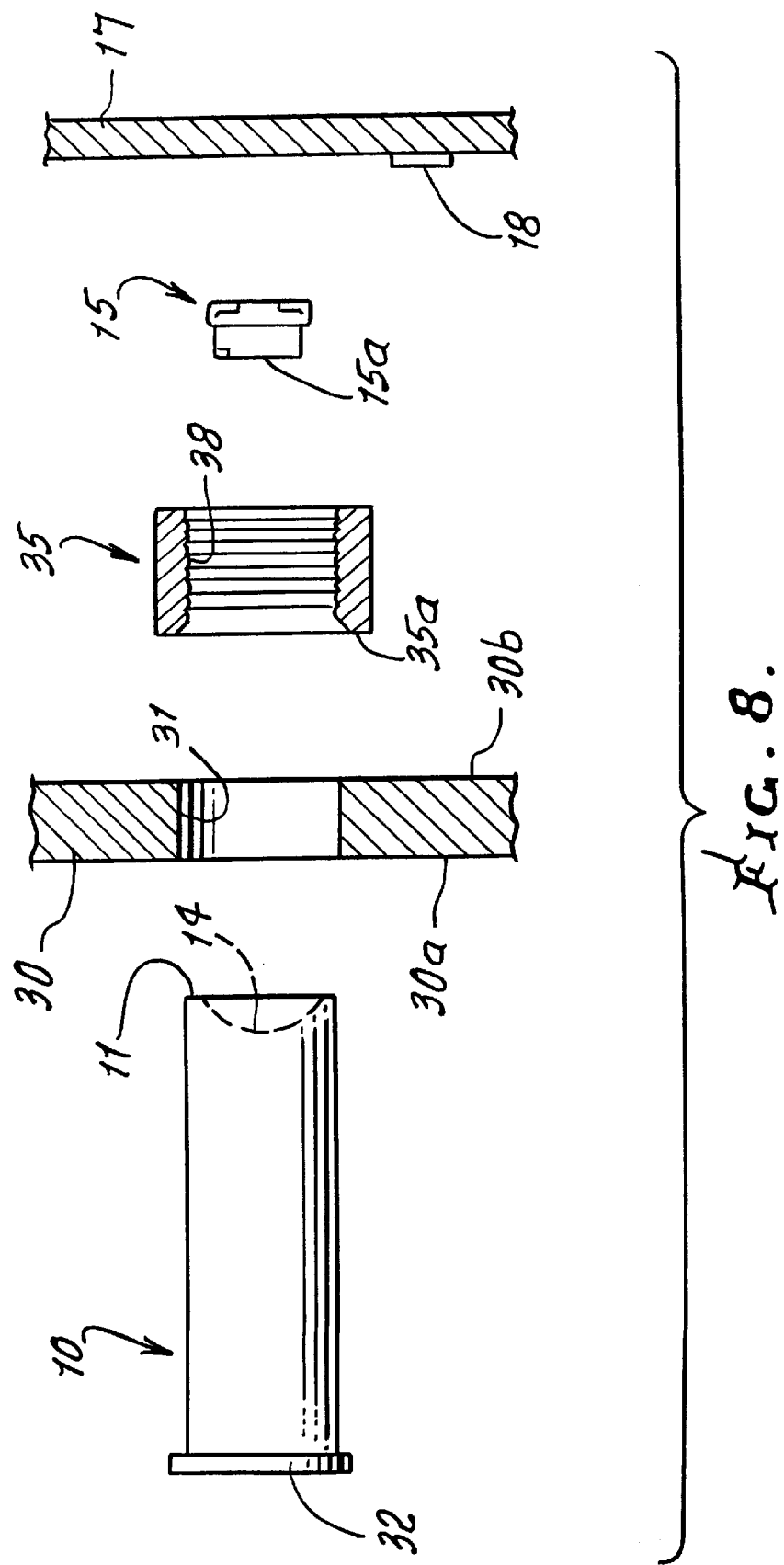

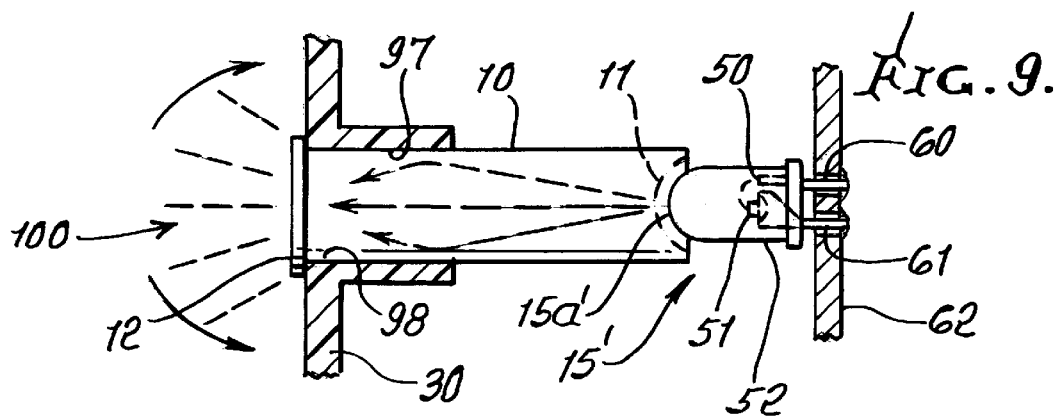
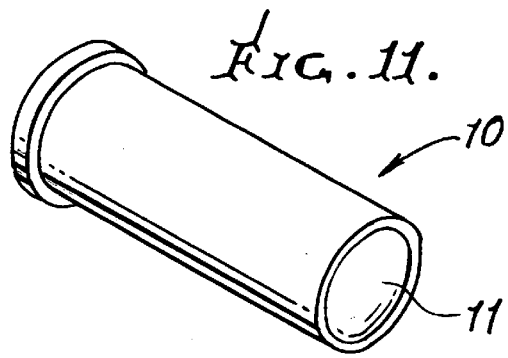
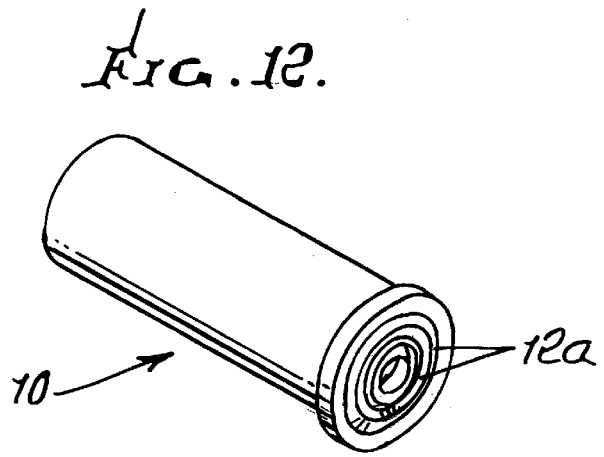
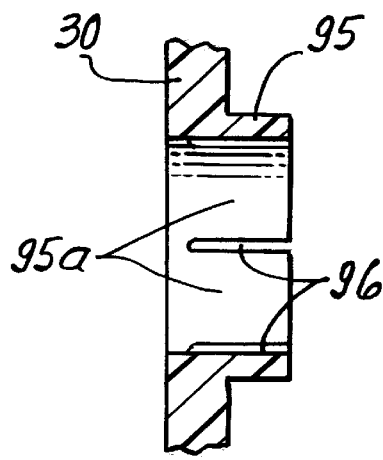
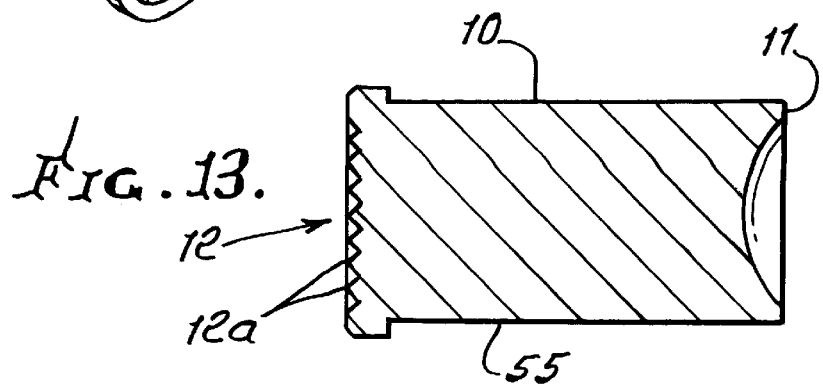

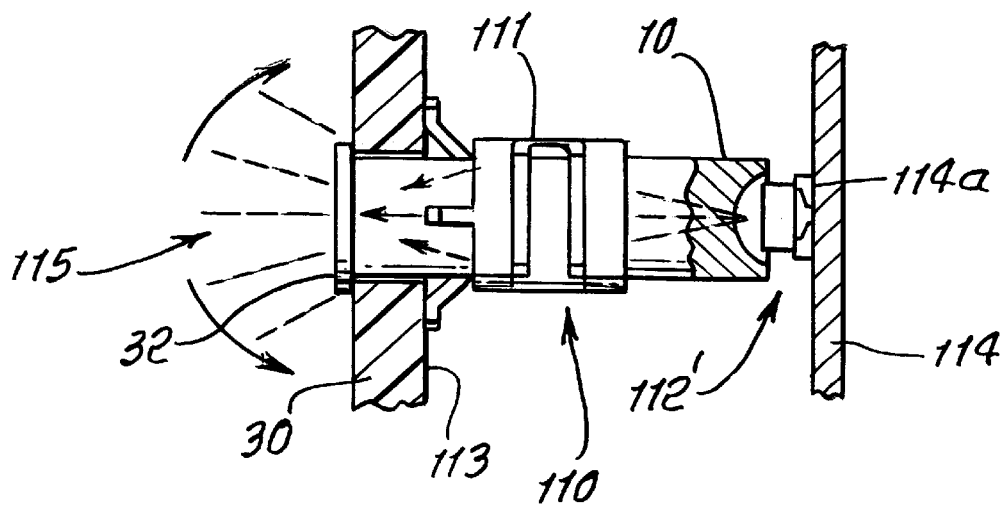
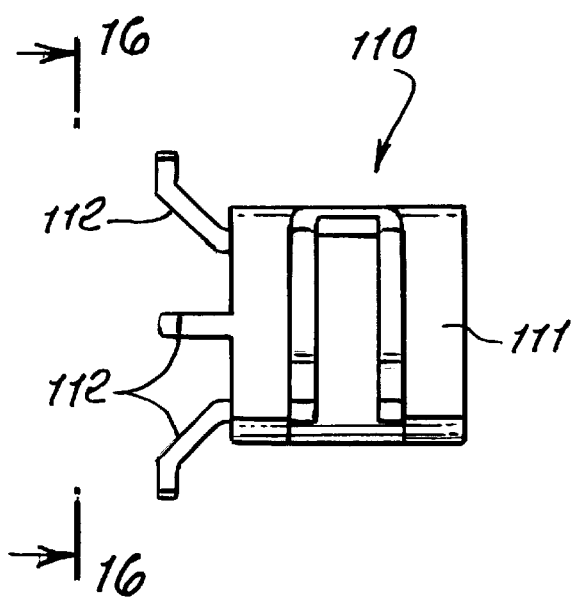
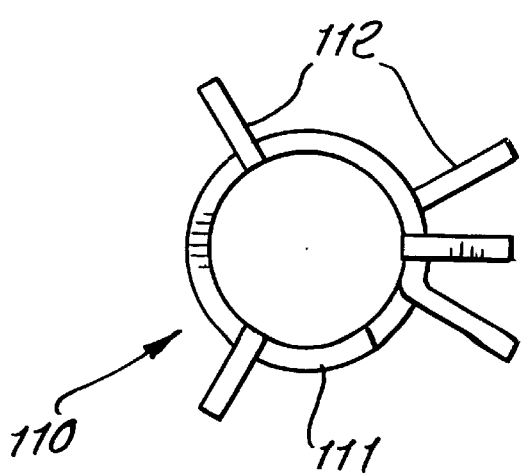

OPTICAL COUPLING OF LIGHT PIPES, WITH LIGHT DIFFUSION

This application is a continuation-in-part of Ser. No. 09/188,279, filed Nov. 9, 1998.

BACKGROUND OF THE INVENTION

This invention relates generally to optical coupling of light sources and light pipes; and more particularly concerns endwise optical coupling of LEDs to fiber optics light pipes in a simple and effective manner to maintain their coaxial relationship during light transmission from the LED to the light pipe, as will appear.

There is need for improvements in apparatus, and methods, to overcome difficulties in optical coupling as between light sources and light pipes; and there is need to improve light transmission between and by these elements. Also, there is need to provide for diffusion of light transmitted by light pipes, and especially where light of different colors is to be transmitted and mixed.

SUMMARY OF THE INVENTION

It is a major object of the invention to provide improvements in such optical coupling, as will meet the referenced needs.

Basically, the light transmission device of the invention comprises, in combination:

a) a longitudinally axially extending light pipe having opposite ends, b) one of those ends having a light diffusing surface.

As will appear the other of the light pipe ends may also have a light diffusing surface to enhance the desired light diffusing effect, and the light pipe typically has a wall along its length that is light reflecting.

Another object is to provide facets at one of the light pipe ends, such as the end that transmits light from the light pipe, and such facets may advantageously comprise Fresnel rings. The surfaces of the latter may be scored to provide a diffusing surface of the light pipe end.

A further object is to provide a recess at the end of the light pipe that receives light from the LED. As will appear, the surface of that recess may also or alternatively be scored to provide for light diffusion. The recess may typically be dished, and define a concavely curved inner wall via which light is transmitted into the light pipe. Further, the light source may typically have a flat or convex portion thereof received into the recess, whereby the recess defines a perimeter extending about the light source. The light source may be attached, as by surface mounting, to a printed circuit board, and the light pipe end recess typically defines a perimeter that projects toward said board, sidewardly of the light source which comprises an LED.

It is another object of the invention to provide a light source comprising an LED having at least two emitters of light of different wavelengths. For example the emitters may comprise red and yellow light emitters, such light being mixed in response to diffusion by the end or ends of the light pipe, to produce a resultant amber output.

A further object includes provision of a support panel carrying the light pipe, in spaced relation to said recess. The faceted opposite end of the light pipe typically terminates proximate the panel, and a pipe flange engages one side of the panel. A grip ring may be provided for gripping the light pipe and engaging the opposite side of the panel.

The method of diffusing light transmitted by a light source and light pipe, in accordance with the invention, includes the steps a) providing a light pipe support, b) assembling the light pipe to the support, and c) assembling the light pipe and light source so that the light source projects at an end portion of the light pipe in spaced relation to the support, d) the light pipe having opposite ends, at least one of such ends provided with a light diffusing surface.

Additional objects include providing the opposite end of the light pipe with a light diffusing surface; providing a recess at an end of the light pipe, and assembling the light pipe and light source to receive a portion of the light source into said recess; providing the recess to have a concave inner wall facing the light source; providing facets on an end of the light pipe; providing light diffusing surfaces on said facets; providing grip structure gripping the light pipe; providing a flange on the light pipe, and locating a panel to extend between said grip structure and flange, to be engaged thereby; and providing the light source to comprise an LED having at least two emitters of light of different wavelengths.

These and other objects and advantages of the invention, as well as the details of an illustrative embodiment, will be more fully understood from the following specification and drawings, in which:

DRAWING DESCRIPTION

FIG. 1 is an elevation taken in section to show positioning of the light pipe relative to a light source such as an LED, and with a panel supporting the light pipe;

FIG. 2 is a perspective view showing one end of the light pipe;

FIG. 3 is a perspective view showing the opposite end of the light pipe;

FIG. 4 is an enlarged section showing a light pipe incorporating the invention;

FIG. 5 is an end view taken on lines 5—5 of FIG. 4;

FIG. 6 is an enlarged axial section taken through a grip ring employed to retain the light pipe to a mounting panel;

FIG. 7 is an end view taken on lines 7—7 of FIG. 6;

FIG. 8 is an axially exploded view showing elements as also seen in FIG. 1;

FIG. 9 is a view like FIG. 1, but showing a light diffusing light pipe;

FIG. 10 is an enlarged section showing a panel support for the light pipe of FIG. 9;

FIG. 11 is a perspective view of a light diffusing light pipe, and showing the light receiving end of the pipe;

FIG. 12 is a perspective view of the FIG. 11 light pipe and showing its light transmitting end;

FIG. 13 is an enlarged axial section taken through the FIG. 11 light pipe;

FIG. 14 is a view like FIG. 9, showing retaining clip support of the light pipe;

FIG. 15 is an enlarged side elevation view of the clip shown in FIG. 14;

FIG. 16 is an end view taken on lines 16—16 of FIG. 15;

DETAILED DESCRIPTION

Figure 17:
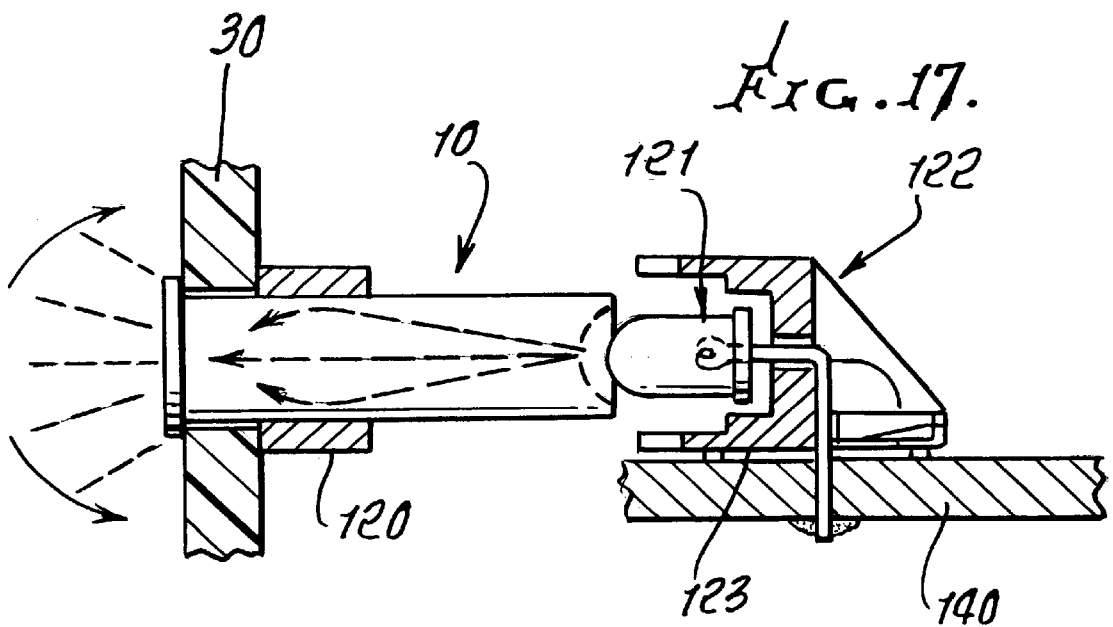
FIG. 17 is a view like FIG. 9; but showing right angle circuit board mount of an LED coupled to the recessed end of a light pipe.

FIGS. 1–6 show a light pipe or fiber optics cable 10 of relatively short axial length between its opposite ends 11 and 12. End 11 defines a recess 13 for reception of light source structure that transmits light endwise into the light pipe.

In the example, the recess may typically and advantageously define a dished inner wall 14 which may be concavely curved. That wall positions the light source 15 shown as an LED, and having an end portion 15a received into the recess, with light pipe perimeter 10a extending about the LED. Dished wall 14 may also axially mutually center the light pipe and the light source, as seen in FIG. 1. The LED 15 also shown as surface mounted at 16 on the printed circuit board 17, which also typically carries other circuitry, shown at 18, for example. Light rays from the LED pass into the light pipe and travel generally axially, as indicated at 19–21. The light pipe perimeter 10a projects toward the circuit board.

The opposite end 12 of the cylindrical light pipe may advantageously define light transmitting facets shown as extending in circular arcs at 12a, in FIG. 5. Light is transmitted by the facets as indicated at rays 23–27, within a cone. Cone angularity may advantageously be about 120°.

FIG. 1 shows a support panel 30 carrying the forward end extent 10b of the light pipe in endwise spaced relation to recess 13. End extent 10b typically projects through an opening 31 in that panel, with pipe faceted end 12 located proximate the panel side 30a. A cylindrical flange 32 may be formed by or on the light pipe to engage panel side 30a, to accurately endwise position the light pipe relative to the panel.

Further positioning of the light pipe is afforded by an annular grip ring 35 extending closely about the light pipe to grip its outer surface at 10c. The grip ring is axially adjusted to cause the forward end 35a of the ring to engage the panel rearward side 30b, whereby the panel is retained between the ring and the flange 32. This also serves to axially space the panel relative to the circuit board, in a sample, predetermined, and effective manner. The grip ring may have serrations 38 at its bore, to frictionally engage the light pipe outer surface 10d, and block axial movement of the grip ring axially rightwardly relative to the light pipe, in FIG. 1.

The method of positioning a light pipe and light source, includes the steps:
 a) providing a panel,
 b) assembling the light pipe to the panel to project through an opening in the panel,
 c) and assembling the light pipe and light source so that the light source projects into an end portion of the light pipe in spaced relation to the panel.

That end portion of the light pipe may define the concave recess 13, as referred to, to engage and optically axially align the light pipe and LED.

The method may also include providing grip structure gripping the light pipe, and providing a flange on the light pipe, and locating the panel to extend between said grip structure and flange, to be engaged thereby, for positioning the panel relative to a circuit board that carries the LED, as by surface mounting.

FIGS. 9 and 10 show preferred structure including elements generally the same as in FIGS. 1–6, like elements being given the same identifying numerals. The LED light source may have at least two emitters of light of different wave lengths. Two such emitters are indicated at 50 and 51, within housing 52. As an example, the emitters may emit red and yellow light, and it is desired to mix such light to produce amber light transmitted at 100 at the end 12 of the light pipe. To accomplish this, light diffusing surfaces are provided at one or both ends 11 and 12 of the light pipe.

Such light diffusing surfaces may be provided by roughening or lightly scoring the light pipe end surface or surfaces shown as dished inner wall 11 in FIG. 11, and as angled surfaces of annular facets 12a in FIG. 12. See also FIG. 13. The facets may comprise Fresnel rings extending in circular arcs, as shown. The light pipe itself has a cylindrical wall 55 along its length that is light reflecting, to reflect light back into the pipe. Accordingly, light of two or more different colors transmitted into the pipe, and within the pipe, exits the pipe as thoroughly mixed or diffused.

Note also, that the end portion 15a' of the light source 15' is domed to present a convex surface to the concave or dished wall 11, for close coupling. LED terminals 60 and 61 are carried by circuit board 62, to orient 15'. The pipe is press fitted at 97 and 98 into plastic panel 30. FIG. 10 shows axially extending slots 96 in sleeve 95, to allow sleeve finger 95a expansion during fitting of the pipe into the sleeve.

FIGS. 14–16 show a retaining spring clip 110 having a sleeve portion 111 fitting about the pipe 10, and to the outer wall of the pipe. Clip fingers 112 project from the sleeve and bear against the inner wall 113 of the panel 30 through which the pipe extends. Flange 32 on the pipe 10 bears against the outer surface of the panel 30, whereby the flange 32 and the spring fingers 112 press against opposite sides of the panel to maintain the pipe extending normal to the panel. The LED unit 112' is here surface mounted at 114a to a printed circuit board 114, to project into the recess at the end of the light pipe. One or both ends of the pipe are typically scored to provide for diffusion, of light transmitted at 115 at the transmitting end of the pipe. Light diffusion or mixing within the light pipe enables mixing of two or more colors emitted by emitters within the LED.

Figure 18:
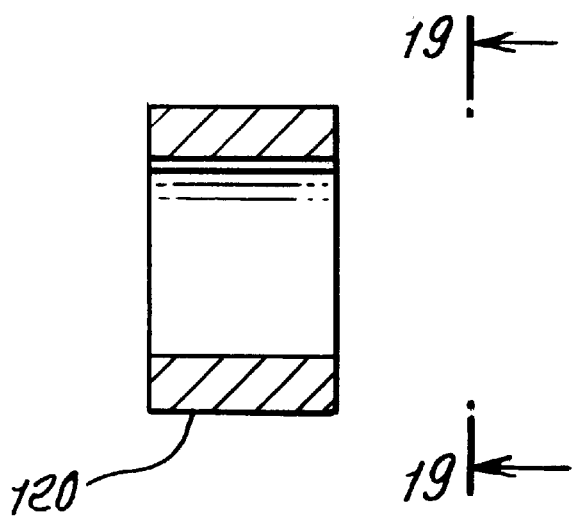
FIG. 18 is an enlarged section taken through a grommet as used in FIG. 17.
Figure 19:
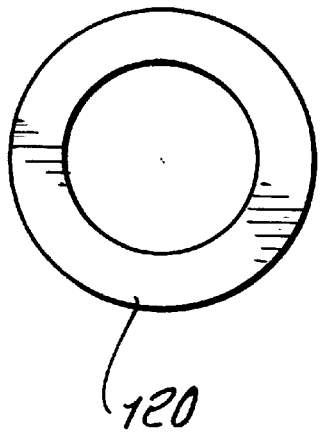
FIG. 19 is an end view of the FIG. 18 grommet.

FIGS. 17–19 are like FIGS. 9–13, but provide for retention of the pipe 10 to the display panel 30 by a retaining grommet 120 attached to the pipe surface. The LED unit 121 is carried by a right angle mount 122, which has a base 123 surface mounted to the printed circuit board 140, as shown. One or both pipe end wall surfaces are light diffusing, i.e. seared as in FIGS. 9–12.

I claim:

1. A light transmission device, comprising in combination:
 a) a longitudinally axially extending light pipe having an outer wall and opposite ends, the pipe having solid configuration crosswise of its length at locations along the pipe length spaced from a light receiving end zone bounded by the pipe outer wall,
 b) at least one of said ends having a light diffusing surface.

2. The combination of claim 1 wherein the other of said ends also has a light diffusing surface.

3. The combination of claim 1 wherein said light pipe has a wall along its length which is light reflecting.

4. The combination of claim 1 wherein one of said opposite ends defines facets that extend about an axis defined by the pipe at said one end.

5. The combination of claim 4 wherein said facets define Fresnel rings.

6. The combination of claim 4 wherein said light diffusing surface is defined by said facets.

7. The combination of claim 6 wherein said facets define Fresnel rings.

8. A light transmission device, comprising in combination:
 a) a longitudinally axially extending light pipe having an outer wall and opposite ends,
 b) at least one of said ends having a light diffusing surface,
 c) and wherein one of said ends defines a recess for reception of light source structure that transmits light into said light pipe.

9. The combination of claim 8 wherein said recess defines a concavely curved inner wall via which light is transmitted into the light pipe.

10. The combination of claim 9 including said light source having a portion thereof received into the recess, whereby the recess defines a perimeter extending about the light source.

11. The combination of claim 10 including a circuit board to which the light source in the form of an LED is attached, the recess perimeter projecting toward said board, sidewardly of the LED.

12. The combination of claim 4 wherein said facets extend in substantially circular arcs.

13. The combination of claim 1 including a support panel carrying the light pipe, in spaced relation to said recess.

14. The combination of claim 13 wherein the opposite end of the light pipe terminates proximate said panel.

15. A light transmission device, comprising in combination:
   a) a longitudinally axially extending light pipe having an outer wall and opposite ends,
   b) at least one of said ends having a light diffusing surface,
   c) and including said light source comprising an LED having at least two emitters of light of different wavelength.

16. The combination of claim 15 wherein said emitters are red and yellow light emitters.

17. The combination of claim 13 wherein the light pipe has a flange engaging one side of the panel, and there being a clip gripping the light pipe and engaging the opposite side of the panel.

18. The method of diffusing light transmitted by a light source and light pipe, that includes:
   a) providing a light pipe support,
   b) assembling the light pipe to the support, and
   c) assembling the light pipe and light source so that the light source projects at an end portion of the light pipe in spaced relation to the support,
   d) the light pipe having an outer wall and opposite ends, at least one of said ends provided with a light diffusing surface,
   e) the pipe having solid configuration crosswise of its length at locations along the pipe length spaced from a light receiving end bounded by the pipe outer wall.

19. The method of claim 18 including also providing the opposite end of the light pipe with a light diffusing surface.

20. The method of diffusing light transmitted by a light source and light pipe, that includes:
   a) providing a light pipe support,
   b) assembling the light pipe to the support, and
   c) assembling the light pipe and light source so that the light source projects at an end portion of the light pipe in spaced relation to the support,
   d) the light pipe having opposite ends, at least one of said ends provided with a light diffusing surface,
   e) and including providing a recess at an end of the light pipe, and assembling the light pipe and light source to receive a portion of the light source into said recess.

21. The method of claim 20 including providing said recess to have a concave inner wall facing the light source.

22. The method of claim 20 including providing facets on an end of the light pipe proximate said panel, and providing light diffusing surfaces on said facets.

23. The method of claim 18 including providing grip structure gripping the light pipe and providing a flange on the light pipe, and locating the panel to extend between said grip structure and flange, to be engaged thereby.

24. The method of diffusing light transmitted by a light source and light pipe, that includes:
   a) providing a light pipe support,
   b) assembling the light pipe to the support, and
   c) assembling the light pipe and light source so that the light source projects at an end portion of the light pipe in spaced relation to the support,
   d) the light pipe having opposite ends, at least one of said ends provided with a light diffusing surface,
   e) and including providing said light source to comprise an LED having at least two emitters of light of different wavelengths.

25. The method of claim 24 wherein said emitters are red and yellow light emitters.

26. The method of claim 18 including providing said light pipe to have a light reflecting surface between said opposite ends.

27. A light transmission device, comprising, in combination:
   a) a light pipe having an outer wall and opposite ends,
   b) one of said ends defining an end zone via which light is transmitted into the light pipe to travel therein,
   c) the opposite end of the light pipe defining light diffusing surfaces via which light is transmitted from the light pipe,
   d) the pipe having solid configuration crosswise of its length at locations along the pipe length spaced from said end zone bounded by the pipe outer wall.

28. The combination of claim 27 wherein said light diffusing surfaces define facets.

29. The combination of claim 28 wherein said facets extend along ring-shaped paths that extend about an axis defined by the light pipe.

30. A light transmission device, comprising, in combination:
   a) a light pipe having opposite ends,
   b) one of said ends defining an entrance via which light is transmitted into the light pipe to travel therein,
   c) the opposite end of the light pipe defining light diffusing surfaces via which light is transmitted from the light pipe,
   d) and wherein said entrance is re-entrant and is concave.

31. The combination of claim 30 including LED structure closely facing said concave surface.

32. The combination of claim 27 wherein said LED structure is at least partly received in said recess at said one end of the light pipe.

33. The combination of claim 17 including support structure supporting the light pipe at a side thereof, and spaced from said one end of the light pipe.

34. The combination of claim 33 wherein said light pipe projects beyond said support structure whereby said light pipe opposite end is everywhere spaced from said support structure.

35. The combination of claim 34 including a support panel engaged by said support structure at locations at opposite sides of the light pipe.

36. The combination of claim 34 including a support panel spaced from said opposite end of the light pipe, and engaged by said support structure at spaced locations for orienting the light pipe to extend in substantially perpendicular relation to a plane defined by the panel.

37. The combination of claim 31 including a circuit board carrying said LED structure.

* * * * *